United States Patent [19]

Shigeta

[11] Patent Number: 4,630,212
[45] Date of Patent: Dec. 16, 1986

[54] SEWING MACHINE WITH MEMORY INPUT RECONFIGURATION BASED ON TYPE OF MEMORY BEING USED

[75] Inventor: Katsunori Shigeta, Aichi, Japan
[73] Assignee: Mitsubishi Denki K.K., Tokyo, Japan
[21] Appl. No.: 555,925
[22] Filed: Nov. 29, 1983
[30] Foreign Application Priority Data
Nov. 29, 1982 [JP] Japan .................... 57-208783
[51] Int. Cl.$^4$ .................................. D05B 19/00
[52] U.S. Cl. ............................ 364/470; 364/200; 371/21; 112/277
[58] Field of Search ... 364/900 MS File, 200 MS File, 364/470; 371/21; 112/277

[56] References Cited

U.S. PATENT DOCUMENTS

| | | | |
|---|---|---|---|
| 4,003,032 | 1/1977 | Austin et al. | 364/200 |
| 4,095,265 | 6/1978 | Urba | 364/200 |
| 4,281,392 | 7/1981 | Grants et al. | 364/900 |
| 4,488,300 | 12/1984 | Horey et al. | 371/21 |
| 4,545,010 | 3/1985 | Salas | 364/200 |

FOREIGN PATENT DOCUMENTS 2830242 6/1979 Fed. Rep. of Germany .
2902033 1/1980 Fed. Rep. of Germany .

Primary Examiner—Jerry Smith
Assistant Examiner—Allen MacDonald
Attorney, Agent, or Firm—Sughrue, Mion, Zinn, Macpeak & Seas

[57] ABSTRACT

An apparatus for controlling a sewing machine includes a control circuit having connector lines for reading data from a semiconductor memory device and a switching circuit for automatically switching the connector lines dependent on the type of the semiconductor memory device employed by reading a keyword stored at a head address in the semiconductor memory device. The control apparatus can use any type of semiconductor memory device available at the present time and in the future. The switching circuit includes a logic circuit which can be implemented by a simple gating circuit.

5 Claims, 3 Drawing Figures

SEWING MACHINE WITH MEMORY INPUT RECONFIGURATION BASED ON TYPE OF MEMORY BEING USED

BACKGROUND OF THE INVENTION

The present invention relates to an apparatus for controlling a sewing machine to stitch a prescribed pattern by successively reading out pattern data written in a semiconductor memory device.

One prior apparatus of the type described above is shown in FIG. 1 of the accompanying drawings. The apparatus includes a control circuit 1 in the form of an eight-bit microcomputer, for example, and a semiconductor memory device 2 in which pattern data has been written. Sixteen address lines 3 which convey addresses for specifying data storage locations in the semiconductor memory device 2. The semiconductor memory device 2 is physically arranged such that it can easily be replaced with other memory devices having different pattern data stored therein. The apparatus also includes eight data lines 4 for delivering data stored at an address specified by the address lines 3 to the control circuit 1, and control signal lines 5 for delivering a control signal from the control circuit 1 to the semiconductor memory device 2.

The operation of the conventional control apparatus shown in FIG. 1 is as follows: During a cycle in which the control circuit 1 reads data, the control circuit 1 issues signals necessary for reading the data from the semiconductor memory device 2 over the control signal lines 5 (indicated by C0–C3), and the semiconductor memory device 2 is in readiness for sending out the data over the data lines 4. At this time, the 16 address lines 3 (designated by A0–A15) deliver a first address signal of "0000 0000 0000 0000" to address a head address in the semiconductor memory device 2. The data stored in the head address is then delivered over the data lines 4 (indicated by D0–D7) and read by the control circuit 1. Address signals are then successively delivered over the address lines 3, and data stored at the addresses specified by such successive address signals is delivered sequentially from the semiconductor memory device 2 over the data lines 4 (D0–D7) and read by the control circuit 1.

When the control circuit 1 reads pattern data for sewing, for example, stored in the semiconductor memory device 2, the control circuit 1 controls various parts of an electronic sewing machine for stitching a predetermined pattern based on the pattern data the control circuit 1 has read. Since the semiconductor memory device 2 with data written therein is replaceable, it may be replaced by another data storage semiconductor memory device to sew a different pattern.

The conventional electronic sewing machine control apparatus of the foregoing construction can effect sewing with various different sewing patterns simply by changing semiconductor memory devices. There are a wide variety of semiconductor memory devices presently available, and the trend is toward the development of larger-capacity, less costly devices. However, the prior control apparatus of the type described above can be used with only one type of semiconductor memory device available at present, and thus is poor in compatibility.

SUMMARY OF THE INVENTION

With the foregoing prior difficulties in view, it is an object of the present invention to provide a sewing machine control apparatus which can use any semiconductor memory device presently commercially available for pattern data storage.

Another object of the present invention is to provide a sewing machine control apparatus which can used semiconductor memory devices developed in the future.

Still another object of the present invention is to provide a sewing machine control apparatus which is inexpensive and reliable in operation.

According to the present invention, an apparatus for controlling a sewing machine includes a control circuit having connector lines for reading data from a semiconductor memory device, and a switching circuit for automatically switching the connector lines dependent on the type of the semiconductor memory device employed.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
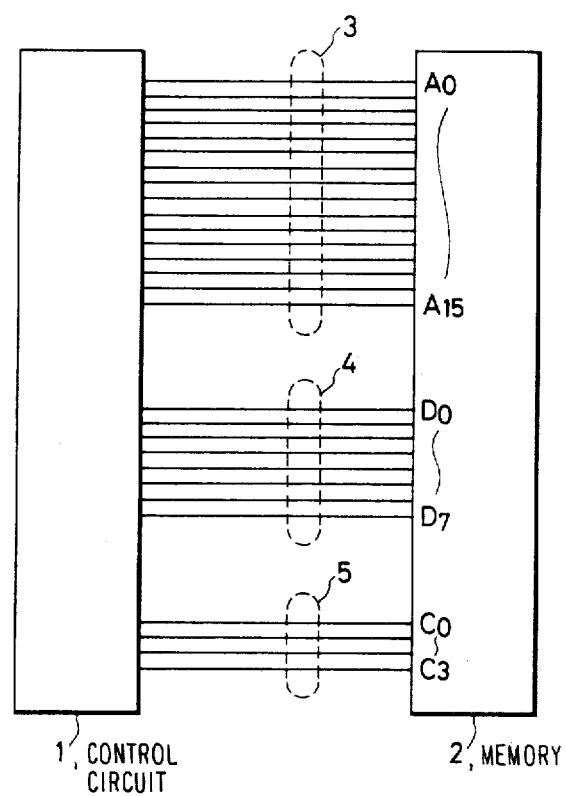
FIG. 1 is a block diagram of a circuit arrangement of a conventional control apparatus.
Figure 2:
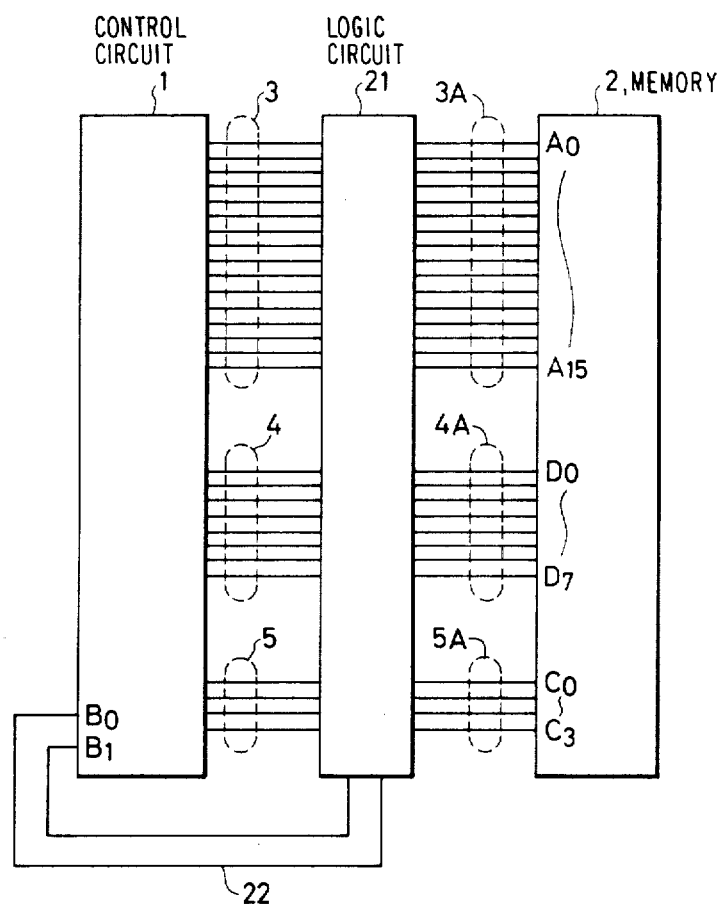
FIG. 2 is a block diagram of a circuit arrangement of a control apparatus according to the present invention.
Figure 3:
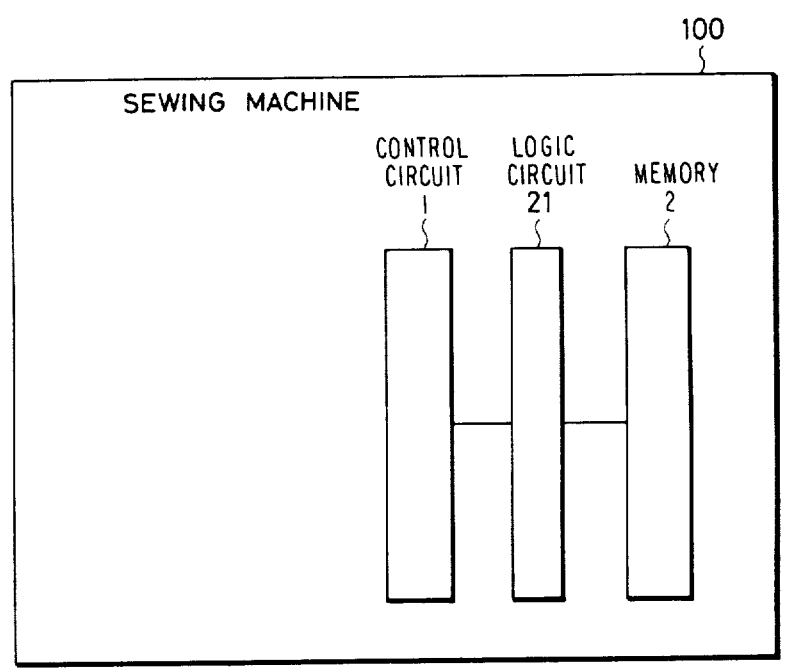
FIG. 3 is a block diagram of a circuit arrangement of the control apparatus of FIG. 2 as placed in a sewing machine.

FIG. 2 shows in block form a control apparatus for use with a sewing machine, for example, according to a preferred embodiment of the present invention. While FIG. 3 shows the a sewing machine 100 with the control circuitry and memory device arrangement of FIG. 2 disposed therein, the actual circuitry of the invention will be described with respect to FIG. 2. The operation of the control circuitry, other than the interchangeability of different kinds of memory devices, is conventional, and need not be described here. Like or identical parts in FIG. 2 are denoted by like or identical reference characters in FIG. 1 and have like or identical functions.

The control apparatus includes a control circuit 1 composed of an eight-bit microcomputer, for example, a semiconductor memory device 2 in which pattern data has been written, and 16 address lines 3 for specifying data storage locations in the semiconductor memory device 2. The semiconductor memory device 2 is physically arranged such that it can be replaced with other memory devices having different pattern data stored therein. The control apparatus also includes eight data lines 4 for delivering data stored at an address specified by the address lines 3 to the control circuit 1, and control signal lines 5 for delivering a control signal from the control circuit 1 to the semiconductor memory device 2.

The control apparatus further includes a logic circuit 21 for switching connections of the address lines, the data lines, and the control signal lines dependent on the type of the semiconductor memory device 2 employed, switching control signal lines 22 for determining the switching connection effected by the logic circuit 21, and address lines 3A, data lines 4A, and control signal lines 5A the connections of which are determined by the logic circuit 21.

The operation of the control apparatus of FIG. 2 will now be described. The semiconductor memory device 2 stores a keyword at a head address related to the type of the semiconductor memory device 2. It is assumed as an example that a first type of semiconductor memory device stores a keyword "AA" and a second type of semiconductor memory device stores a keyword "BB". The control circuit 1 issues switching signals for addressing the first type of semiconductor memory device 2 through terminal B0 and B1 to the logic circuit 21. The logic circuit 21 is responsive to the switching signals for switching connections of the address lines 3, data lines 4, and control signal lines 5 into the switched address lines 3A, data lines 4A, and control signal lines 5A which properly address the first type of semiconductor memory device 2. The control circuit 1 then issues a signal for specifying a head address of "0000 0000 0000 0000" over the address lines 3 and 3A to the semiconductor memory device 2.

When the keyword "AA" is issued from the semiconductor memory device 2 over the data lines 4A and 4, the control circuit 1 determines that the memory device 2 is the first type of semiconductor memory device, and then successively reads pattern data from the memory device 2.

When the second type of semiconductor memory device 2 is connected, neither the keyword "AA" nor "BB" can be issued over the data lines D0–D7 from the semiconductor memory device 2 when the control circuit 1 delivers a signal for addressing a head address over the address lines 3 and 3A to the memory device 2. This is because the logic circuit 21 is now connected to address the first type of semiconductor device and cannot properly address the second type of semiconductor memory device. Therefore, the control circuit 1 issues a signal for addressing the second type of semiconductor memory device through the terminals B0 and B1 over the switching signal lines 22 to the logic circuit 21. The logic circuit 21 is responsive to the switching signals for switching the connections of the lines 3, 4 and 5 the connector lines 3A, 4A and 5A which properly address the second type of semiconductor memory device 2. Thereafter, the control circuit 1 issues a signal for addressing the head address and necessary control signals over the connector lines 3, 3A, 5 and 5A to the semiconductor memory device 2, which then delivers the keyword "BB" through the output terminals D0–D7 over the data lines 4A and 4 to the control circuit 1. The control circuit 1 now determines, based on this keyword signal, that the memory device 2 is the second type, and then successively issues address signals for reading data from the semiconductor memory devide 2.

The control apparatus of the present invention, as described above, can automatically determine the type of semiconductor memory device in which data is stored, and then effects line connections suited for that type of semiconductor memory device. Therefore, the control apparatus can use any type of semiconductor memory device available on the market at present for data storage.

The control apparatus is also compatible in that it can be used with memory devices which will be developed in the future. The switching logic circuit can be implemented by a simple gate IC, and therefore the control apparatus itself is inexpensive to construct and highly reliable in operation.

Although a certain preferred embodiment has been shown and described, it should be understood that many changes and modifications may be made therein without departing from the scope of the appended claims.

I claim:

1. An apparatus for controlling a sewing machine, comprising:
   (a) a semiconductor memory device having sewing pattern data and an identification code related to a type of said semiconductor memory device stored therein;
   (b) a control circuit for reading the sewing pattern data from said semiconductor memory device to control the sewing machine for effecting a predetermined sewing operation, said control circuit including connector lines for reading the sewing pattern data from said semiconductor memory device; and
   (c) a switching circuit for automatically switching connections of said connector lines dependent on the type of said semiconductor memory device by reading said identification code from said semiconductor memory device to determine the type thereof and for effecting logic connections of said connector lines suitable for said type of said semiconductor memory device.

2. The apparatus according to claim 1, wherein said control circuit comprises a microcomputer.

3. The apparatus according to claim 1, wherein said connector lines to be switched by said switching circuit include at least one group of address lines for specifying addresses in said semiconductor memory device, data lines for reading data from said semiconductor memory device, and control signal lines for issuing control signals for reading data to said semiconductor memory device.

4. The apparatus according to claim 1, wherein said identification code is stored at a head address in said semiconductor memory, said switching circuit being controlled in response to said identification code.

5. A method of controlling operation of a sewing machine, comprising the following steps:
   (i) issuing switching signals along first switching signal lines from a control circuit, indicative of a particular type of memory device, to a logic circuit connected via first address lines, first data lines, and first control signal lines, to said control circuit, and via second address lines, second data lines, and second control signal lines, to a semiconductor memory device;
   (ii) configuring said first address lines, first data lines, and first control signal lines, for receiving address information and data from said particular type of memory device, in response to said switching signals; and
   (iii) if said semiconductor memory device is of said particular type, receiving an identification code from said semiconductor memory device and subsequently transferring pattern data from said semiconductor memory device to said control circuit; or (iv) if said semiconductor memory device is not of said particular type, repeating steps (i) and (ii) with different switching signals indicative of a different type of memory device, step (ii) then comprising the step of configuring said logic circuit to receive address information and data from said different type of semiconductor memory device, until said logic circuit is configured to receive address information and data from said semiconductor memory device; and (v) receiving said identification code from said semiconductor device, and subsequently transferring pattern data from said semiconductor memory device to said control circuit.

* * * * *